(12) United States Patent
Owen

(10) Patent No.: US 12,534,276 B2
(45) Date of Patent: Jan. 27, 2026

(54) CLOSURE ASSEMBLY AND PACKAGE WITH CLOSURE ASSEMBLY

(71) Applicant: Closure Systems International Inc., Indianapolis, IN (US)

(72) Inventor: Robert H. Owen, Crawfordsville, IN (US)

(73) Assignee: Closure Systems International Inc., Indianapolis, IN (US)

( * ) Notice: Subject to any disclaimer, the term of this patent is extended or adjusted under 35 U.S.C. 154(b) by 98 days.

(21) Appl. No.: 18/602,487

(22) Filed: Mar. 12, 2024

(65) Prior Publication Data

US 2025/0289631 A1 Sep. 18, 2025

(51) Int. Cl.
| | |
|---|---|
| *B65D 50/04* | (2006.01) |
| *B32B 7/06* | (2019.01) |
| *B32B 7/12* | (2006.01) |
| *B32B 15/04* | (2006.01) |
| *B32B 15/20* | (2006.01) |
| *B65D 1/02* | (2006.01) |
| *B65D 41/34* | (2006.01) |
| *B65D 51/22* | (2006.01) |

(52) U.S. Cl.
CPC ............ *B65D 50/041* (2013.01); *B32B 7/06* (2013.01); *B32B 7/12* (2013.01); *B32B 15/04* (2013.01); *B32B 15/20* (2013.01); *B65D 1/0246* (2013.01); *B65D 41/34* (2013.01); *B65D 51/22* (2013.01); *B32B 2307/748* (2013.01); *B32B 2435/02* (2013.01); *B65D 2401/60* (2020.05)

(58) Field of Classification Search
CPC .. B32B 7/06; B32B 7/12; B32B 15/04; B32B 15/20; B32B 2307/748; B32B 2435/02; B65D 50/041; B65D 1/0246; B65D 41/34; B65D 51/22; B65D 2401/60
See application file for complete search history.

(56) References Cited

U.S. PATENT DOCUMENTS

| | | | |
|---|---|---|---|
| 2,423,582 | A | 7/1947 | Coleman |
| 3,160,327 | A | 12/1964 | Porcelli |
| 3,199,702 | A | 8/1965 | Fischbach |
| 3,282,477 | A | 11/1966 | Henchert |
| 3,415,403 | A | 12/1968 | Bardell |
| 3,667,638 | A | 6/1972 | Cambio, Jr. |

(Continued)

FOREIGN PATENT DOCUMENTS

| | | |
|---|---|---|
| EP | 0008190 A1 | 2/1980 |
| GB | 1052734 A | 12/1966 |

(Continued)

*Primary Examiner* — Shawn M Braden
(74) *Attorney, Agent, or Firm* — NIXON PEABODY LLP

(57) ABSTRACT

A polymeric closure assembly includes inner and outer shells, and a liner. The inner shell includes a top wall portion and a skirt portion. The top wall portion of the inner shell forms an opening therein. The skirt portion of the inner shell includes a thread formation. The outer shell includes a top wall portion and a skirt portion. The top wall portion of the outer shell forms an opening therein. The liner attaches to an interior surface of the top wall portion of the inner shell and a finish of the container. The liner includes a substrate layer, a separable layer, a foil layer, and an adhesive layer. The separable layer assists in separating the liner into two pieces.

20 Claims, 13 Drawing Sheets

(56) References Cited

U.S. PATENT DOCUMENTS

| | | |
|---|---|---|
| 3,795,338 A | 3/1974 | Swartzbaugh |
| 3,797,688 A | 3/1974 | Porcelli |
| 3,904,061 A | 9/1975 | Keeler |
| 4,022,357 A | 5/1977 | Dwinell |
| RE29,850 E | 11/1978 | Labarre |
| 4,171,749 A | 10/1979 | Aichinger |
| 4,180,175 A | 12/1979 | Virog, Jr. |
| 4,301,937 A | 11/1981 | Von Hagel |
| 4,345,690 A | 8/1982 | Hopley |
| 4,345,691 A | 8/1982 | Burke |
| 4,418,828 A | 12/1983 | Wilde |
| 4,423,820 A | 1/1984 | Vangor |
| 4,458,822 A | 7/1984 | Ostrowsky |
| 4,470,513 A | 9/1984 | Ostrowsky |
| 4,497,765 A | 2/1985 | Wilde |
| 4,505,401 A | 3/1985 | Berglund |
| 4,506,795 A | 3/1985 | Herr |
| 4,533,062 A | 8/1985 | Krautkraemer |
| 4,534,480 A | 8/1985 | Santostasi |
| 4,550,844 A | 11/1985 | Lininger |
| 4,562,931 A | 1/1986 | Brach |
| 4,573,601 A | 3/1986 | Berglund |
| 4,592,476 A | 6/1986 | Yasada |
| 4,609,115 A | 9/1986 | Moore |
| 4,630,743 A | 12/1986 | Wright |
| 4,635,808 A | 1/1987 | Nolan |
| 4,638,917 A | 1/1987 | Persch |
| 4,682,702 A | 7/1987 | Gach |
| 4,813,561 A | 3/1989 | Ochs |
| 4,818,828 A | 4/1989 | Curley |
| 4,938,370 A | 7/1990 | McBride |
| 4,971,212 A | 11/1990 | Kusz |
| 4,978,017 A | 12/1990 | McBride |
| 4,993,570 A | 2/1991 | Julian |
| 4,997,097 A | 3/1991 | Krautkraemer |
| 5,050,753 A | 9/1991 | Trump |
| 5,133,486 A | 7/1992 | Moore |
| 5,167,335 A | 12/1992 | McBride |
| 5,190,177 A | 3/1993 | Collins |
| 5,205,426 A | 4/1993 | McBride |
| 5,301,849 A | 4/1994 | Guglielmini |
| 5,307,946 A | 5/1994 | Molinaro |
| 5,314,085 A | 5/1994 | Collado Bonet |
| 5,328,044 A | 7/1994 | Roehrs |
| 5,346,082 A | 9/1994 | Ochs |
| 5,356,021 A | 10/1994 | McBride |
| 5,450,972 A | 9/1995 | Zemlo |
| 5,480,045 A | 1/1996 | Molinaro |
| 5,484,101 A | 1/1996 | Hedberg |
| 5,501,349 A | 3/1996 | McCandless |
| 5,564,582 A | 10/1996 | Kamath |
| 5,588,545 A | 12/1996 | King |
| 5,715,959 A | 2/1998 | Pfefferkorn |
| 5,735,426 A | 4/1998 | Babcock |
| 5,755,360 A | 5/1998 | Elliott |
| 5,782,369 A | 7/1998 | Tansey |
| 5,785,209 A | 7/1998 | Guglielmini |
| 5,797,506 A | 8/1998 | Lehmkuhl |
| 5,800,764 A | 9/1998 | Smeyak |
| 5,810,207 A | 9/1998 | Hayashida |
| 5,829,611 A | 11/1998 | Beck |
| 5,833,112 A | 11/1998 | Pape |
| 5,860,542 A | 1/1999 | Takamatsu |
| 5,875,942 A | 3/1999 | Ohmi |
| 5,915,574 A | 6/1999 | Adams |
| 5,915,579 A | 6/1999 | Przytulla |
| 5,934,496 A | 8/1999 | Mogard |
| 5,950,850 A | 9/1999 | Takamatsu |
| 6,006,930 A | 12/1999 | Dreyer |
| 6,016,931 A | 1/2000 | Ohmi |
| 6,044,992 A | 4/2000 | Ma |
| 6,056,136 A | 5/2000 | Taber |
| 6,085,921 A | 7/2000 | Brown |
| 6,089,390 A | 7/2000 | Druitt |
| 6,109,465 A | 8/2000 | Henning |
| 6,112,923 A | 9/2000 | Ma |
| 6,116,440 A | 9/2000 | Zaksenberg |
| 6,116,445 A | 9/2000 | Ikemori |
| 6,125,610 A | 10/2000 | Mogard |
| 6,202,872 B1 | 3/2001 | Smeyak |
| 6,247,605 B1 | 6/2001 | Fujie |
| 6,276,543 B1 | 8/2001 | German |
| 6,325,225 B1 | 12/2001 | Druitt |
| 6,371,316 B1 | 4/2002 | Herr |
| 6,371,317 B1 | 4/2002 | Krueger |
| 6,390,342 B1 | 5/2002 | Mabee |
| 6,484,896 B2 | 11/2002 | Ma |
| 6,491,175 B1 | 12/2002 | Taha |
| 6,527,132 B1 | 3/2003 | Druitt |
| 6,557,714 B2 | 5/2003 | Babcock |
| 6,574,848 B2 | 6/2003 | Fujie |
| 6,673,298 B2 | 1/2004 | Krueger |
| 6,685,049 B1 | 2/2004 | Paladino |
| 6,705,479 B2 | 3/2004 | Druitt |
| 6,776,314 B2 | 8/2004 | Odet |
| 6,779,672 B2 | 8/2004 | Kano |
| 6,793,101 B2 | 9/2004 | Shinozaki |
| 6,991,123 B2 | 1/2006 | Druitt |
| 7,014,055 B2 | 3/2006 | Kano |
| D530,603 S | 10/2006 | Lohrman |
| 7,128,227 B2 | 10/2006 | Skillin |
| 7,204,389 B2 | 4/2007 | Smith |
| D547,184 S | 7/2007 | Kim |
| 7,308,988 B2 | 12/2007 | Yashima |
| 7,344,039 B2 | 3/2008 | Bixler |
| 7,451,898 B2 | 11/2008 | Seidita |
| D588,915 S | 3/2009 | Lohrman |
| 7,503,468 B2 | 3/2009 | Druitt |
| 7,559,432 B2 | 7/2009 | Mavin |
| 7,607,547 B2 | 10/2009 | Kumata |
| 7,637,384 B2 | 12/2009 | Price |
| D608,199 S | 1/2010 | Gross |
| D610,454 S | 2/2010 | Lohrman |
| D626,410 S | 11/2010 | Lohrman |
| 7,832,579 B2 | 11/2010 | Lohrman |
| 7,861,873 B1 | 1/2011 | Bragg |
| 7,942,287 B2 | 5/2011 | King |
| 7,975,864 B2 | 7/2011 | Druitt |
| 8,302,794 B2 | 11/2012 | Russell |
| 8,807,360 B2 | 8/2014 | Erspamer |
| 9,598,209 B1 | 3/2017 | Maldonado |
| 9,651,884 B2 | 5/2017 | Urabe |
| 9,963,274 B2 | 5/2018 | Brunner |
| 10,138,043 B2 | 11/2018 | Mazurkiewicz |
| 10,173,816 B2 | 1/2019 | Danks |
| D847,633 S | 5/2019 | Berge |
| 10,414,560 B1 | 9/2019 | Aryanpanah |
| D871,904 S | 1/2020 | Berge |
| D871,905 S | 1/2020 | Kim |
| 10,875,689 B2 | 12/2020 | Sanguinet |
| 10,913,583 B2 | 2/2021 | Sanguinet |
| 12,386,104 B2 * | 8/2025 | Lee ............... B32B 27/304 |
| 2001/0011821 A1 | 8/2001 | Lind |
| 2001/0015355 A1 | 8/2001 | Adams |
| 2001/0027957 A1 | 10/2001 | Kano |
| 2002/0030031 A1 | 3/2002 | Druitt |
| 2002/0066713 A1 | 6/2002 | Ma |
| 2002/0134747 A1 | 9/2002 | Babcock |
| 2003/0071042 A1 | 4/2003 | Adams |
| 2003/0116523 A1 | 6/2003 | Druitt |
| 2003/0136753 A1 | 7/2003 | Biesecker |
| 2004/0060893 A1 | 4/2004 | Kano |
| 2004/0065665 A1 | 4/2004 | Mahdi |
| 2004/0118846 A1 | 6/2004 | Merolla |
| 2004/0155007 A1 | 8/2004 | Hearld |
| 2004/0217083 A1 | 11/2004 | Mavin |
| 2004/0238478 A1 | 12/2004 | Druitt |
| 2005/0092750 A1 | 5/2005 | Lohrman |
| 2005/0189312 A1 | 9/2005 | Bixler |
| 2005/0205618 A1 | 9/2005 | Mabee |
| 2006/0000793 A1 | 1/2006 | Mavin |
| 2006/0163193 A1 | 7/2006 | Smeyak |
| 2007/0125785 A1 | 6/2007 | Robinson |
| 2007/0131641 A1 | 6/2007 | Higgins |

(56) References Cited

U.S. PATENT DOCUMENTS

| | | |
|---|---|---|
| 2008/0073313 A1 | 3/2008 | Brant |
| 2008/0078765 A1 | 4/2008 | Steiger |
| 2008/0078775 A1 | 4/2008 | Steiger |
| 2008/0087625 A1 | 4/2008 | Kumata |
| 2008/0110848 A1 | 5/2008 | Lantos |
| 2008/0173611 A1 | 7/2008 | Neputy |
| 2009/0014404 A1 | 1/2009 | Russell |
| 2009/0111040 A1 | 4/2009 | Veregin |
| 2009/0159555 A1 | 6/2009 | Druitt |
| 2009/0220880 A1 | 9/2009 | Moffat |
| 2010/0140268 A1 | 6/2010 | Lohrman |
| 2011/0006031 A1 | 1/2011 | Antier |
| 2011/0174761 A1 | 7/2011 | Molinaro |
| 2011/0290754 A1 | 12/2011 | Taber |
| 2011/0318682 A1 | 12/2011 | Takahashi |
| 2012/0080442 A1 | 4/2012 | Groubert |
| 2012/0248133 A1 | 10/2012 | Danks |
| 2012/0318798 A1 | 12/2012 | Domoy |
| 2013/0026126 A1 | 1/2013 | Adamczak |
| 2013/0137030 A1 | 5/2013 | Sato |
| 2013/0143151 A1 | 6/2013 | Nakashima |
| 2013/0244163 A1 | 9/2013 | Sato |
| 2014/0021157 A1 | 1/2014 | Gren |
| 2014/0263149 A1 | 9/2014 | Berge |
| 2014/0263335 A1 | 9/2014 | Taber |
| 2015/0217910 A1 | 8/2015 | Vogel |
| 2015/0225106 A1 | 8/2015 | Mayer |
| 2015/0272197 A1 | 10/2015 | Swain |
| 2015/0353241 A1 | 12/2015 | Glaser |
| 2015/0370184 A1 | 12/2015 | Araki |
| 2016/0023819 A1 | 1/2016 | Maldonado |
| 2016/0176590 A1 | 6/2016 | Prater |
| 2016/0184182 A1 | 6/2016 | Gross |
| 2016/0318686 A1 * | 11/2016 | Russell ............... B29C 43/146 |
| 2016/0355306 A1 | 12/2016 | Robin |
| 2017/0096273 A1 | 4/2017 | Mazurkiewicz |
| 2018/0186122 A1 * | 7/2018 | Bourgeois ............. B29C 65/76 |
| 2020/0156829 A1 | 5/2020 | Pristera |
| 2022/0002021 A1 | 1/2022 | Krautkramer |
| 2022/0242625 A1 | 8/2022 | Schmidt |
| 2022/0332474 A1 | 10/2022 | Cahalan |
| 2023/0053070 A1 | 2/2023 | Li |
| 2024/0140665 A1 * | 5/2024 | Rule ...................... B32B 27/08 |

FOREIGN PATENT DOCUMENTS

| | | |
|---|---|---|
| GB | 1054308 A | 1/1967 |
| GB | 1593072 A | 7/1981 |
| GB | 2068912 A | 8/1981 |
| GB | 2311060 A | 9/1997 |
| JP | 2010256613 A | 11/2010 |
| JP | 2011114313 A | 6/2011 |
| WO | 2002076839 A2 | 10/2002 |

* cited by examiner

CLOSURE ASSEMBLY AND PACKAGE WITH CLOSURE ASSEMBLY

FIELD OF THE INVENTION

The present invention relates generally to a closure assembly and a package with a closure assembly. More specifically, the present invention relates to a polymeric closure assembly with tamper-evident and child-resistance features.

BACKGROUND OF THE INVENTION

Polymeric closures have been used in many applications over the years in conjunction with containers. One type of polymeric closure that has been used with containers is a tamper-evident polymeric closure. Tamper-evident closures are used to prevent or inhibit tampering by providing a visible indication to a user if the closure has been opened. It is also desirable for the polymeric closure to be lightweight and also to be friendly for adult usage, while being child-resistant.

It would be desirable to provide a closure assembly that provides such advantages.

SUMMARY

According to one aspect of the present disclosure, a polymeric closure assembly comprises a polymeric outer shell, a polymeric inner shell and a liner. The polymeric outer shell includes a polymeric top wall portion and a polymeric annular skirt portion, The polymeric top wall portion of the polymeric outer shell forms an opening therein. The polymeric annular skirt portion of the polymeric outer shell depends from the polymeric top wall portion of the polymeric outer shell. The polymeric top wall portion of the outer shell includes an exterior surface and an interior surface. The polymeric inner shell includes a polymeric top wall portion and a polymeric annular skirt portion. The polymeric top wall portion of the polymeric inner shell forms an opening therein. The polymeric annular skirt portion of the polymeric inner shell depends from the polymeric top wall portion of the polymeric inner shell. The polymeric top wall portion of the polymeric inner shell includes an exterior surface and an interior surface. The polymeric annular skirt portion of the polymeric inner shell includes an exterior surface and an interior surface. The interior surface of the polymeric annular skirt portion of the polymeric inner shell includes a thread formation for mating engagement with a thread formation of a container. The polymeric inner shell resides within the polymeric outer shell. The liner is configured to be attached to the interior surface of the polymeric top wall portion of the polymeric inner shell and a finish of the container. The liner includes a substrate layer, a separable layer, a foil layer, and an adhesive layer. The separable layer is located between the substrate layer and the foil layer. The foil layer is located between the separable layer and the adhesive layer. The separable layer is configured to assist in separating the liner into two pieces.

According to a configuration of the above implementation, the thread formation of the polymeric inner shell is an internal thread formation for mating engagement with an external thread formation of a container.

According to another configuration of the above implementation, the interior surface of the polymeric top wall portion of the polymeric outer shell includes a plurality of torque-transfer ribs. The exterior surface of the polymeric top wall portion of the polymeric inner shell includes a plurality of torque-transfer extending projections. The plurality of torque-transfer ribs and the plurality of torque-transfer extending projections cooperate to form a child-resistant feature by preventing or inhibiting opening of the container by only rotational movement. In one embodiment, each of the plurality of torque-transfer extending projections has a generally straight side and an opposing ramped side.

According to a further configuration of the above implementation, the liner further includes a second adhesive layer. The substrate layer is located between the second adhesive layer and the separable layer.

In a further aspect of the above implementation, the liner further includes a second adhesive layer and a second foil layer. The second foil layer is located between the second adhesive layer and the substrate layer.

In a further aspect of the above implementation, the liner further includes a second adhesive layer, a second foil layer and a third adhesive layer. The second foil layer is located between the second adhesive layer and the third adhesive layer. The third adhesive layer is located between the second foil layer and the substrate layer.

In yet a further aspect of the above implementation, the opening forming the polymeric top wall portion of the polymeric outer shell extends from about 60 to about 95 percent of the diameter of the polymeric top wall portion of the polymeric outer shell. In another embodiment, the opening forming the polymeric top wall portion of the polymeric outer shell extends from about 70 to about 85 percent of the diameter of the polymeric top wall portion of the polymeric outer shell.

In yet a further aspect of the above implementation, the opening forming the polymeric top wall portion of the polymeric outer shell is substantially the same size as the opening forming the polymeric top wall portion of the polymeric inner shell.

In yet a further aspect of the above implementation, the exterior surface of the polymeric annular skirt portion of the polymeric inner shell forms an outer retention ring extending outwardly. The interior surface of the polymeric annular skirt portion of the polymeric outer shell forms an inwardly-extending annular retention ledge. The outer retention ring and the inwardly-extending annular retention ledge assist in preventing or inhibiting the polymeric inner shell from being separating from the polymeric outer shell.

According to another aspect of the present disclosure, a package comprises a container and a polymeric closure assembly. The container has a neck portion defining an opening. The neck portion has an exterior surface and an interior surface. The container has a thread formation being located on the exterior surface of the neck portion. The polymeric closure assembly is configured for fitment to the neck portion of the container. The polymeric closure assembly includes a polymeric inner shell, a polymeric outer shell and a liner. The polymeric outer shell includes a polymeric top wall portion and a polymeric annular skirt portion. The polymeric top wall portion of the polymeric outer shell forms an opening therein. The polymeric annular skirt portion of the polymeric outer shell depends from the polymeric top wall portion of the polymeric outer shell. The polymeric top wall portion of the outer shell includes an exterior surface and an interior surface. The polymeric inner shell includes a polymeric top wall portion, a polymeric annular skirt portion and a liner. The polymeric top wall portion of the polymeric inner shell forms an opening therein. The polymeric annular skirt portion of the polymeric inner shell depends from the polymeric top wall portion of the polymeric inner shell. The polymeric top wall portion of the polymeric inner shell includes an exterior surface and an interior surface. The polymeric annular skirt portion of the polymeric inner shell includes an exterior surface and an interior surface. The interior surface of the polymeric annular skirt portion of the polymeric inner shell includes a thread formation for mating engagement with the thread formation of the container. The polymeric inner shell resides within the polymeric outer shell. The liner is configured to be attached to the interior surface of the polymeric top wall portion of the polymeric inner shell and a finish of the container. The liner includes a substrate layer, a separable layer, a foil layer, and an adhesive layer, The separable layer is located between the substrate layer and the foil layer. The foil layer is located between the separable layer and the adhesive layer. The separable layer is configured to assist in separating the liner into two pieces.

According to a further configuration of the above implementation, the interior surface of the polymeric top wall portion of the polymeric outer shell includes a plurality of torque-transfer ribs. The exterior surface of the polymeric top wall portion of the polymeric inner shell includes a plurality of torque-transfer extending projections. The plurality of torque-transfer ribs and the plurality of torque-transfer extending projections cooperate to form a child-resistant feature by preventing or inhibiting opening of the container by only rotational movement.

In a further aspect of the above implementation, the liner further includes a second adhesive layer. The substrate layer is located between the second adhesive layer and the separable layer.

In a further aspect of the above implementation, the liner further includes a second adhesive layer and a second foil layer. The second foil layer is located between the second adhesive layer and the substrate layer.

In yet a further aspect of the above implementation, the liner further includes a second adhesive layer, a second foil layer and a third adhesive layer. The second foil layer is located between the second adhesive layer and the third adhesive layer. The third adhesive layer is located between the second foil layer and the substrate layer.

In yet a further aspect of the above implementation, the opening forming the polymeric top wall portion of the polymeric outer shell extends from about 60 to about 95 percent of the diameter of the polymeric top wall portion of the polymeric outer shell.

In yet a further aspect of the above implementation, the exterior surface of the polymeric annular skirt portion of the polymeric inner shell forms an outer retention ring extending outwardly. The interior surface of the polymeric annular skirt portion of the polymeric outer shell forms an inwardly-extending annular retention ledge. The outer retention ring and the inwardly-extending annular retention ledge assist in preventing or inhibiting the polymeric inner shell from being separating from the polymeric outer shell.

In a further aspect of the above implementation, the separable layer includes a waxy adhesive layer, a patterned alpha olefin wax, pressure-sensitive adhesive, or an ultra-low density polyethylene (ULDPE).

In a further aspect of the above implementation, a total thickness of the liner is from about 1.8 to about 7 mils.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1A:
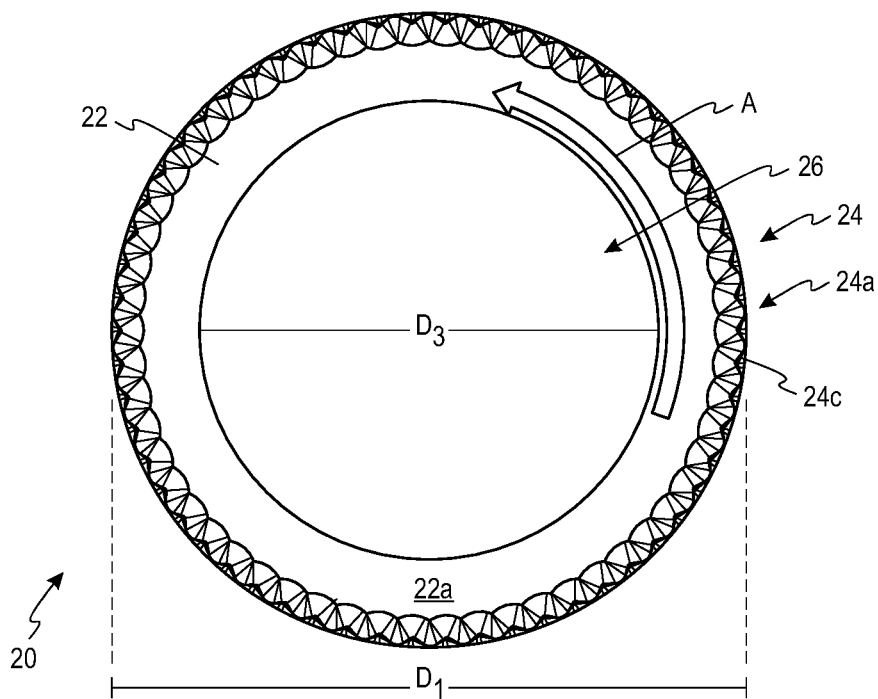
FIG. 1A is a top view of a polymeric outer shell to be used in a polymeric closure assembly according to one embodiment.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Figure 3A:
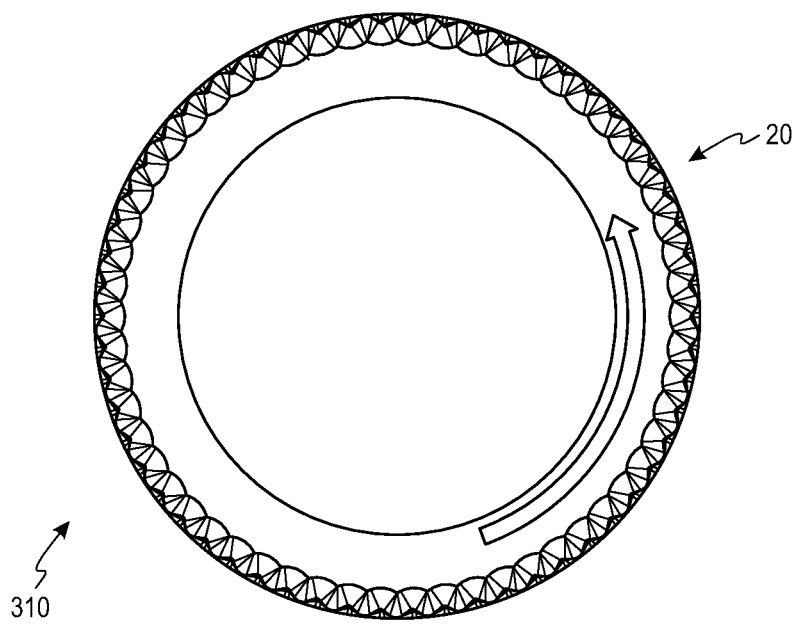
FIG. 3A is a top view of a polymeric closure assembly using the polymeric outer shell of FIG. 1A and the polymeric inner shell of FIG. 2A without a liner.
Figure 3B:
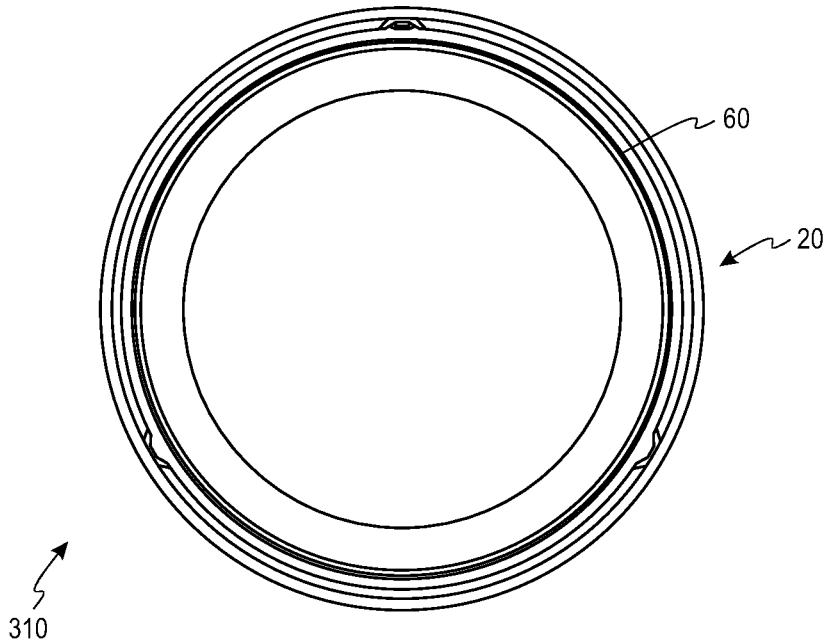
FIG. 3B is a bottom view of the polymeric closure assembly of FIG. 3A.
Figure 3C:
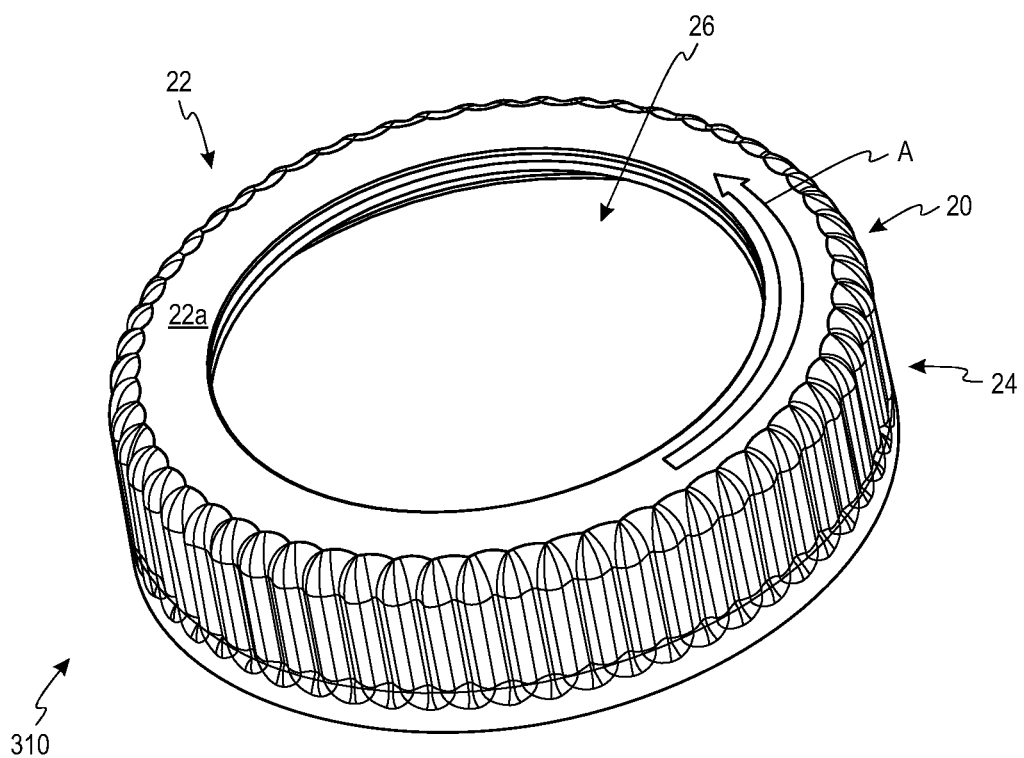
FIG. 3C is a top perspective view of the polymeric closure assembly of FIG. 3A.
Figure 5A:
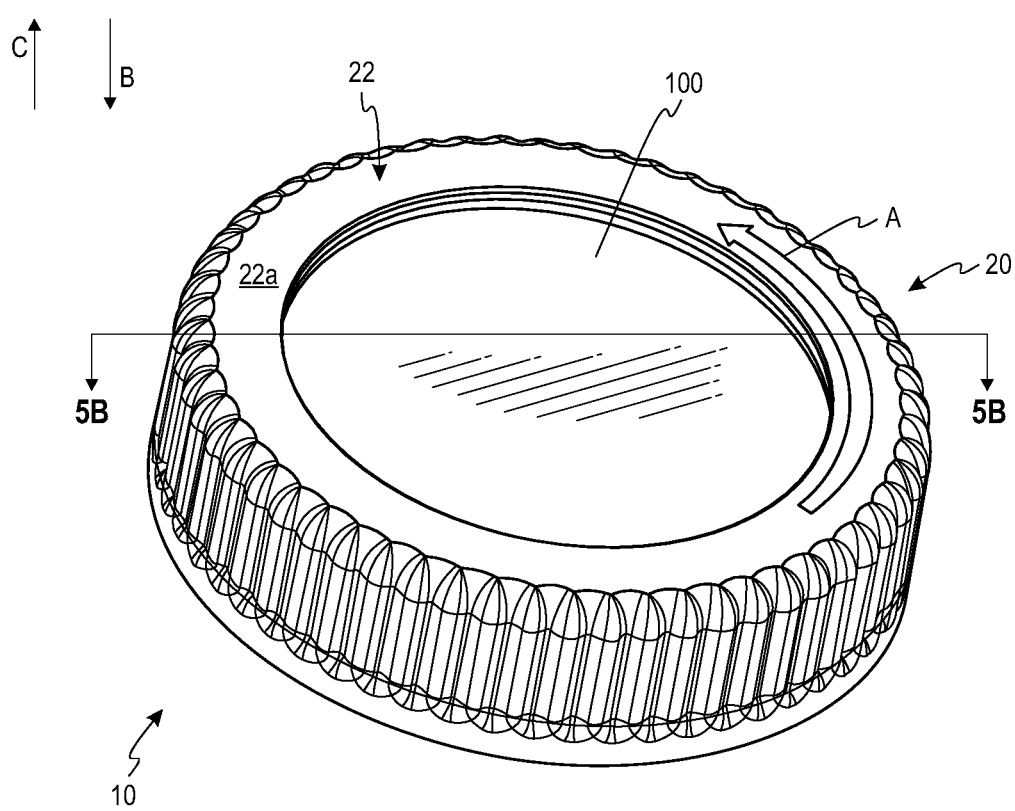
FIG. 5A is a top perspective view of the polymeric container assembly of FIG. 3C with a liner according to one embodiment.
Figure 5B:
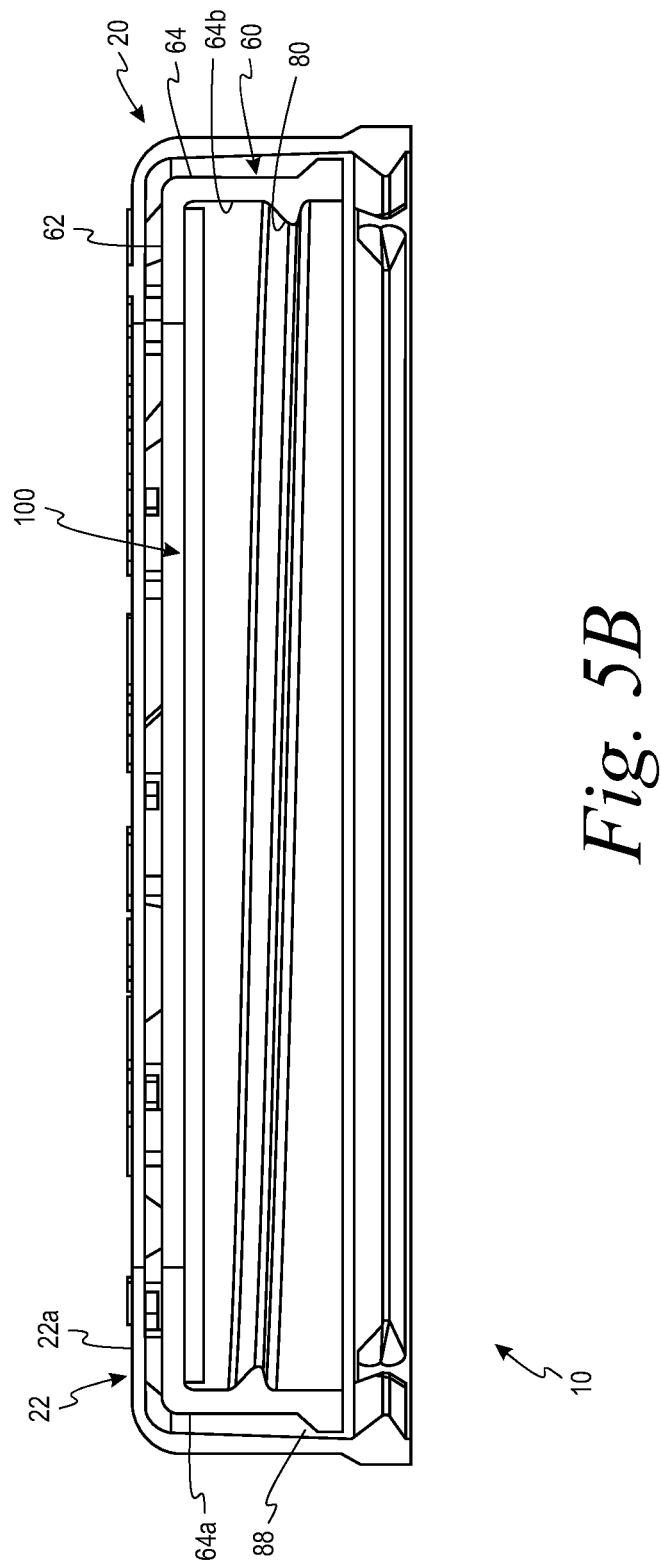
FIG. 5B is a cross-sectional view of FIG. 5A of the polymeric closure assembly taken generally along line 5B-5B.

Referring to FIGS. 5A, 5B, a polymeric closure assembly 10 according to one embodiment is shown with a liner 100. Referring to FIGS. 3A-3C, a polymeric closure assembly 310 according to another embodiment is shown without a liner. The polymeric closure assemblies 10, 310 includes a polymeric outer shell 20 and a polymeric inner shell 60. The polymeric inner shell 60 resides within the polymeric outer shell 20. The polymeric outer shell 20 is shown in FIGS.

Figure 2A:
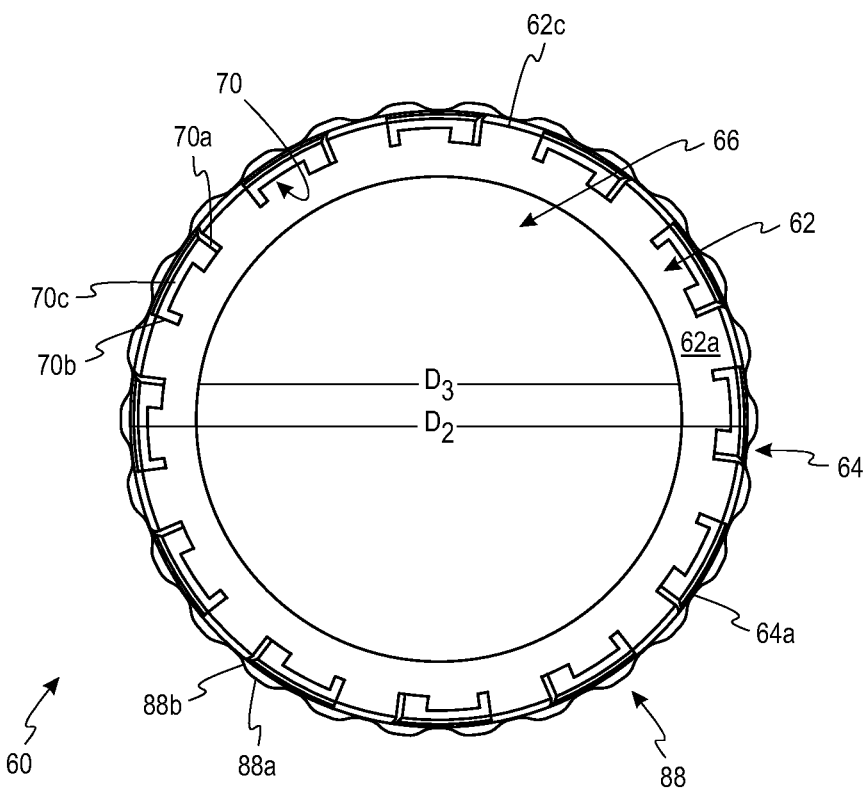
FIG. 2A is a top view of a polymeric inner shell to be used in a polymeric closure assembly according to one embodiment.
Figure 2B:
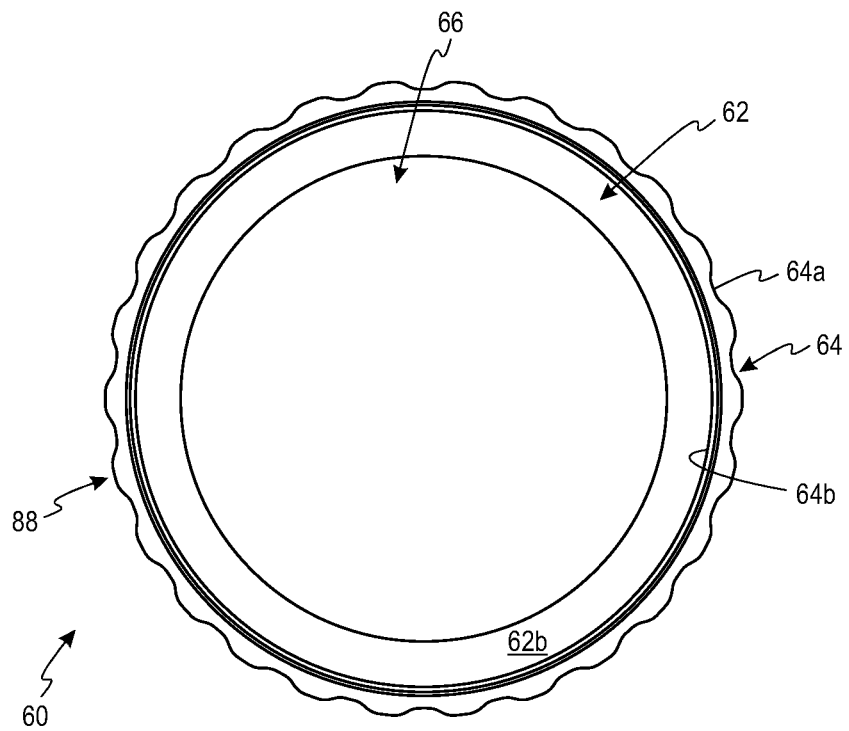
FIG. 2B is a bottom view of the polymeric inner shell of FIG. 2A.
Figure 2C:
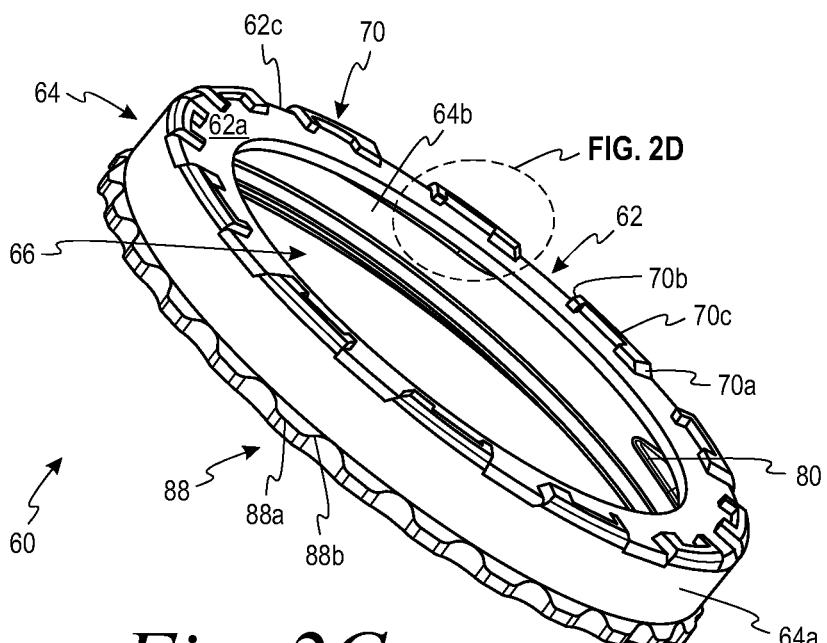
FIG. 2C is a top perspective view of the polymeric inner shell of FIG. 2A.
Figure 6:
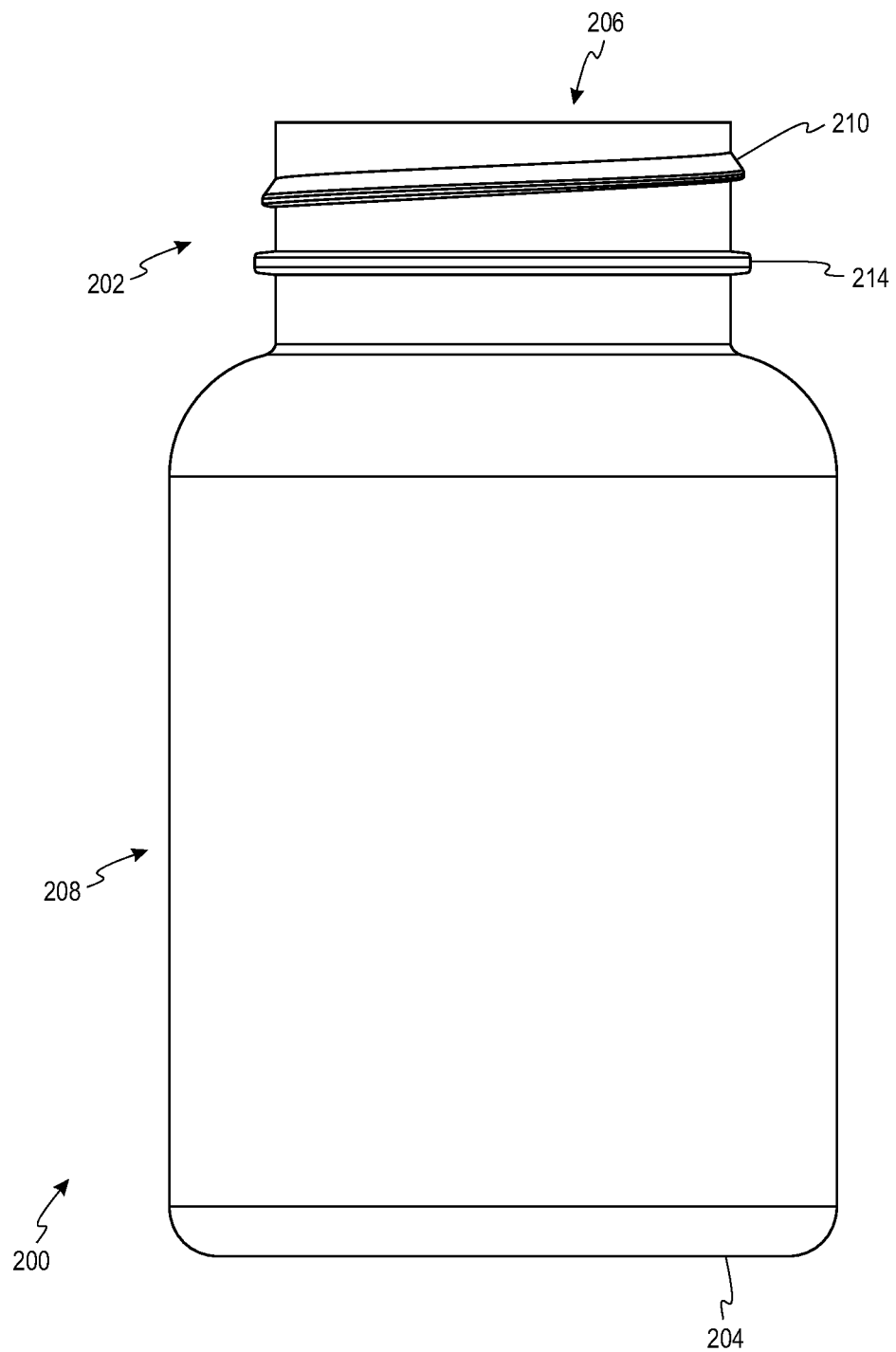
FIG. 6 is a side view of a container according to one embodiment.
Figure 7A:
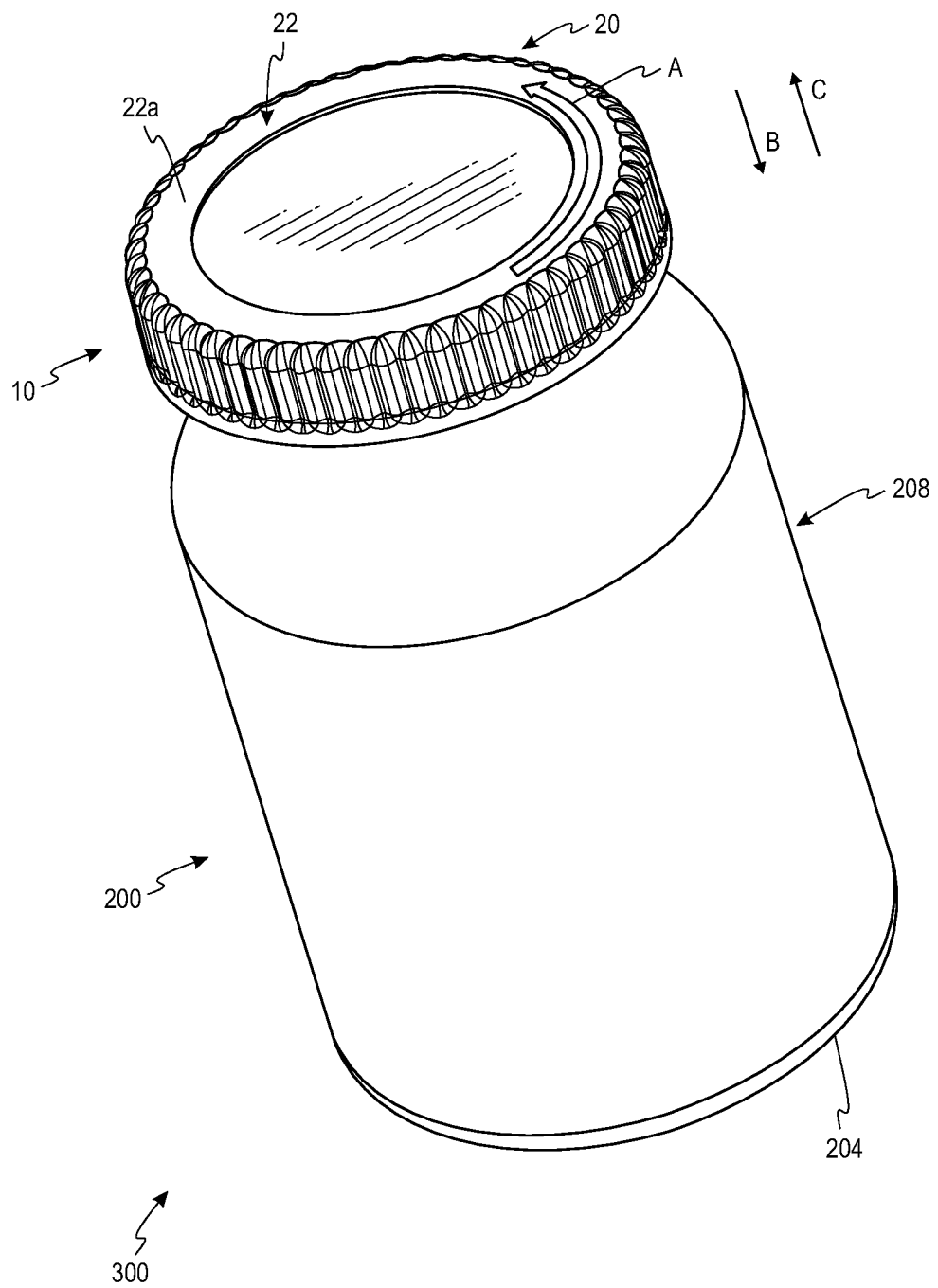
FIG. 7A is a top perspective view of a package using the container of FIG. 6 and the polymeric closure assembly of FIG. 5A.
Figure 7B:
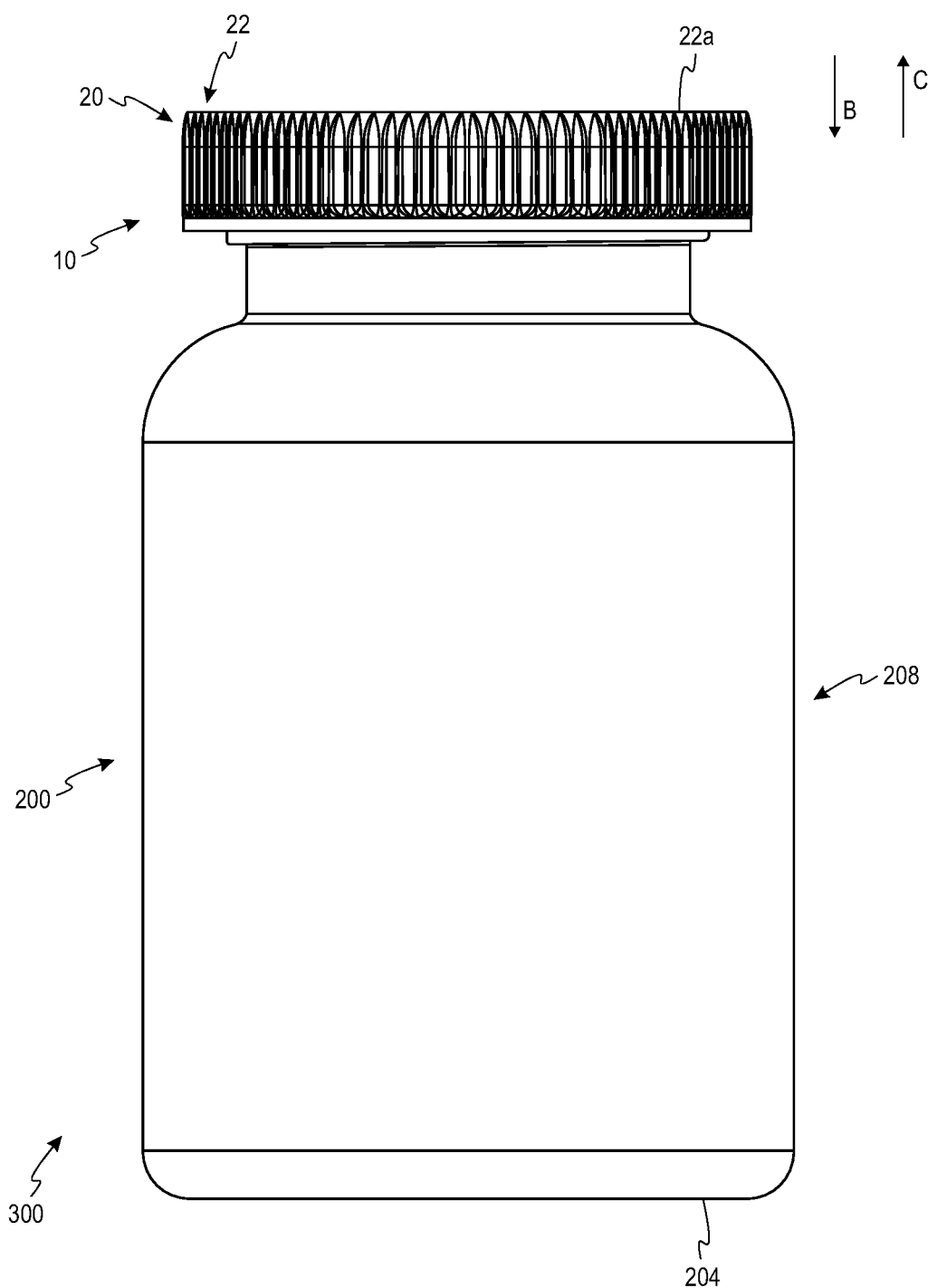
FIG. 7B is a side view of the package of FIG. 7A.

1A-1C, while the polymeric inner shell 60 is shown in FIGS. 2A-2C. The polymeric closure assembly 10 is configured to be used with a container 200, which is shown in FIG. 6. Specifically, the polymeric closure assembly 10 is configured for fitment to the neck portion of the container 200 for closing and opening of the container. The polymeric closure assembly 10 and the container 200 form a package 300 that is shown in FIGS. 7A, 7B.

The polymeric closure assemblies of the present invention are advantageous by being lightweight as compared to similarly sized polymeric closure assemblies, while at the same time providing tamper evident and child-resistance features, and being adult friendly. The polymeric closure assemblies of the present invention are also advantageous from a recyclability standpoint in that the polymeric closure assemblies are typically made from one material, if desired. The polymeric outer and inner shells are typically configured to be recyclable such that they can be used as material sources in future applications after removal of the liner.

Referring back to FIGS. 1A-1C, the polymeric outer shell 20 includes a polymeric top wall portion 22 and a polymeric annular skirt portion 24. The polymeric annular skirt portion 24 depends from the polymeric top wall portion 22. The polymeric top wall portion 22 has an exterior surface 22a and an interior surface 22b. The polymeric annular skirt portion 24 has an exterior surface 24a and an interior surface 24b.

Figure 1B:
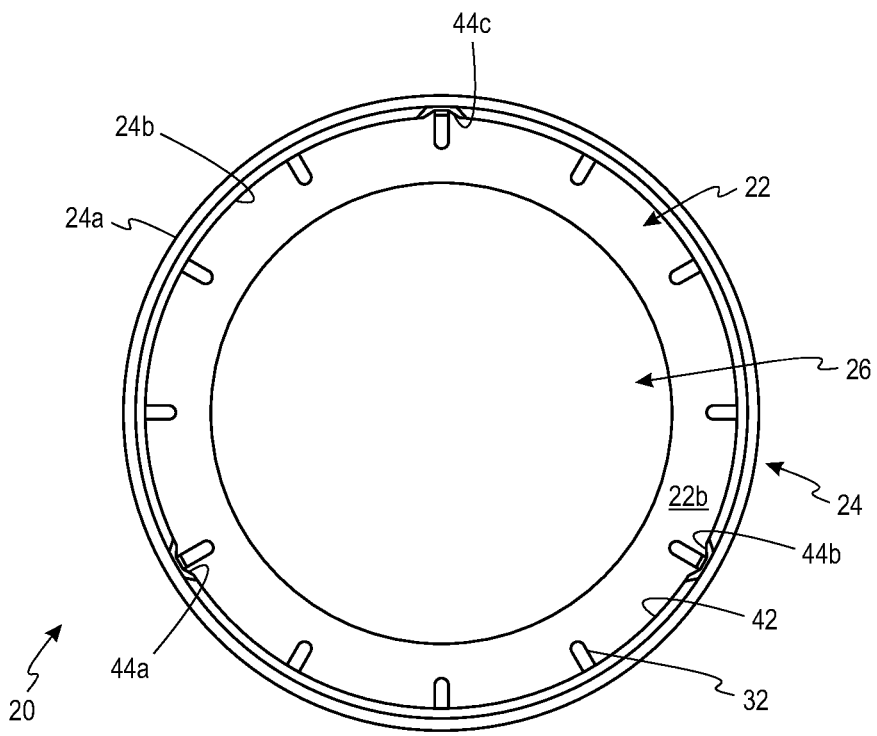
FIG. 1B is a bottom view of the polymeric outer shell of FIG. 1A.
Figure 1C:
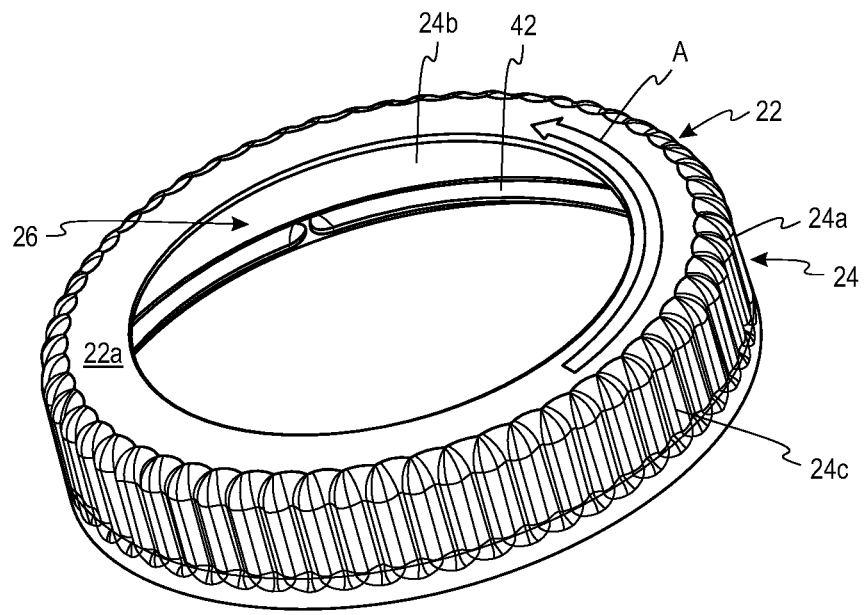
FIG. 1C is a top perspective view of the polymeric outer shell of FIG. 1A.

The polymeric top wall portion 22 forms an opening 26 as best shown in FIG. 1C. The opening 26 of FIGS. 1A-1C is shown as being generally circular. Thus, in this embodiment, the polymeric outer shell 20 as viewed from a top view (FIG. 1A) is in the form of an outer ring or a doughnut. It is contemplated that the opening formed in the polymeric top wall portion of the polymeric outer shell may be of other non-polygonal shapes such as, for example, an oval. It is also contemplated that the opening in the polymeric top wall portion of the polymeric outer shell may be of polygonal shapes such as a square.

The opening 26 is generally centrally located in the polymeric top wall portion 22. The opening extends from about 60 to 95 percent of the diameter D1 (shown in FIG. 1A) of the polymeric top wall portion 22 of the polymeric outer shell 20 in one embodiment. This opening is shown as diameter D3 in FIG. 1A. In another embodiment, the opening extends from about 65 to 90 percent of the diameter of the polymeric top wall portion of the polymeric outer shell. In a further embodiment, the opening extends from about 70 to 85 percent of the diameter of the polymeric top wall portion of the polymeric outer shell.

Referring specifically to FIG. 1B, the interior surface 22b of the polymeric top wall portion 22 includes a plurality of torque-transfer ribs 32. The plurality of torque-transfer ribs 32 extends inwardly from or near the polymeric annular skirt portion 24. As will be discussed below, each of the torque-transfer ribs 32 is configured to engage with a respective one of the torque-transfer extending projections of the polymeric inner shell 60 to prevent or inhibit opening by rotational movement only of the polymeric closure assembly 10 after being threaded on a container.

The plurality of torque-transfer ribs 32 is shown as being an elongated rectangular shape. It is contemplated that the torque-transfer ribs may be shaped or sized differently from that shown in FIG. 1B. The torque-transfer ribs, however, need to assist in preventing or inhibiting opening or closing of the container by rotational movement only in conjunction with the torque-transfer projections discussed below.

The number of torque-transfer ribs formed on the polymeric top wall portion of the polymeric outer shell may vary but is generally from about 4 to about 20. The number of torque-transfer ribs formed on the polymeric top wall portion of the polymeric outer shell is typically from about 8 to about 16.

Referring back to FIG. 1C, the exterior surface 24a of the polymeric annular skirt portion 24 includes a plurality of ridges or knurls 24c thereon. The plurality of ridges 24c assists a user in gripping the polymeric closure assembly 10 when moving between closed and open positions. It is contemplated that the ridges, if used, may be discontinuous around the periphery of the polymeric outer shell.

The exterior surface 22a of the polymeric top wall portion 22 may further includes instructions to a user on how to open the polymeric closure assembly. For example, an exterior surface of the polymeric top wall portion may include symbols, icons or written language to assist a user with instructions on opening the polymeric closure assembly. In one non-limiting example, an arrow A is shown in a counterclockwise direction in FIGS. 1A, 1C indicating the rotational direction for opening the polymeric closure assembly. This may be coupled with or independently from written language such as "Push Down And Turn To Open" that may be written on an exterior surface of the polymeric top wall portion of the polymeric outer shell.

Referring back to FIGS. 1B, 1C, the interior surface 24b of the polymeric annular skirt portion 24 includes an inwardly-extending annular retention ring or ledge 42 at a bottom portion thereof. The inwardly extending annular retention ledge 42 is located opposite from the polymeric top wall portion 22 of the polymeric outer shell 20. The inwardly-extending annular retention ring 42 assists in retaining the polymeric outer and inner shells 20, 60 together. As shown in FIG. 1B, the inwardly-extending annular retention ring 42 includes a plurality of undercut notches 44a-44c formed therein that assists in the manufacturing process. More specifically, the plurality of undercut notches 44a-44c assists in releasing the polymeric outer shell 20 from a mold when the polymeric outer shell is made by a molding process (e.g., injection molding).

The thickness of the polymeric annular skirt portion 24 of the polymeric outer shell 20 is generally from about 0.02 to about 0.08 inch in one embodiment. In another embodiment, the thickness of the polymeric annular skirt portion of the polymeric outer shell is from about 0.03 to about 0.07 inch. In a further embodiment, the thickness of the polymeric annular skirt portion of the polymeric outer shell is from about 0.04 to about 0.06 inch.

Referring to FIGS. 2A-2C, the polymeric inner shell 60 includes a polymeric top wall portion 62 and a polymeric annular skirt portion 64. The polymeric annular skirt portion 64 depends from the polymeric top wall portion 62. The polymeric top wall portion 62 has an exterior surface 62a and an interior surface 62b. The polymeric annular skirt portion 64 has an exterior surface 64a and an interior surface 64b.

The thickness of the polymeric annular skirt portion 64 of the polymeric inner shell 60 is generally from about 0.02 to about 0.08 inch in one embodiment. In another embodiment, the thickness of the polymeric annular skirt portion of the polymeric inner shell is from about 0.03 to about 0.07 inch. In a further embodiment, the thickness of the polymeric annular skirt portion of the polymeric inner shell is from about 0.04 to about 0.06 inch.

The polymeric top wall portion 62 forms an opening 66 as best shown in FIG. 2C. The opening 66 of FIGS. 2A-2C is shown as being generally circular. Thus, in this embodiment, the polymeric inner shell 60 as viewed from a top view (FIG. 2A) is in the form of an outer ring or a doughnut. It is contemplated that the opening formed in the polymeric top wall portion of the polymeric inner shell may be of other non-polygonal shapes such as, for example, an oval. It is also contemplated that the opening in the polymeric top wall portion of the polymeric inner shell may be of polygonal shapes such as a square.

The opening 66 is generally centrally located in the polymeric top wall portion 62. The opening extends from about 60 to 95 percent of the diameter D2 (FIG. 2A) of the polymeric top wall portion 62 of the polymeric inner shell 60 in one embodiment. This is shown as diameter D3 in FIG. 2A. In another embodiment, the opening extends from about 65 to 90 percent of the diameter of the polymeric top wall portion of the polymeric inner shell. In another embodiment, the opening extends from about 70 to 85 percent of the diameter of the polymeric top wall portion of the polymeric inner shell.

The opening 26 of the polymeric outer shell 20 and the opening 66 of the polymeric inner shell 60 are generally aligned with each other and are typically of the same or similar shape as shown in, for example, in FIGS. 1A, 2A by diameter D3. The diameters of the openings formed in the polymeric outer and inner shells may be substantially the same. It is contemplated that the openings of the polymeric outer and inner shells may differ in shape and size in other embodiments.

The polymeric top wall portion 62 of the polymeric inner shell 60 forms a plurality of torque-transfer extending projections 70 as shown in FIGS. 2A, 2C. The polymeric annular skirt portion 64 includes a thread formation 80 (FIG. 2C) wherein the thread formation 80 of the polymeric inner shell 60 is an internal thread formation for mating engagement with an external thread formation of a container. It is contemplated that internal an eternal threading may be reversed on the polymeric closure assembly and the container.

Referring to FIGS. 2A, 2C, the plurality of torque-transfer extending projections 70 is formed on the polymeric top wall portion 62 of the polymeric inner shell 60. The plurality of torque-transfer extending projections 70 is located near or at an outer edge 62c of the polymeric top wall portion 62.

Figure 2D:
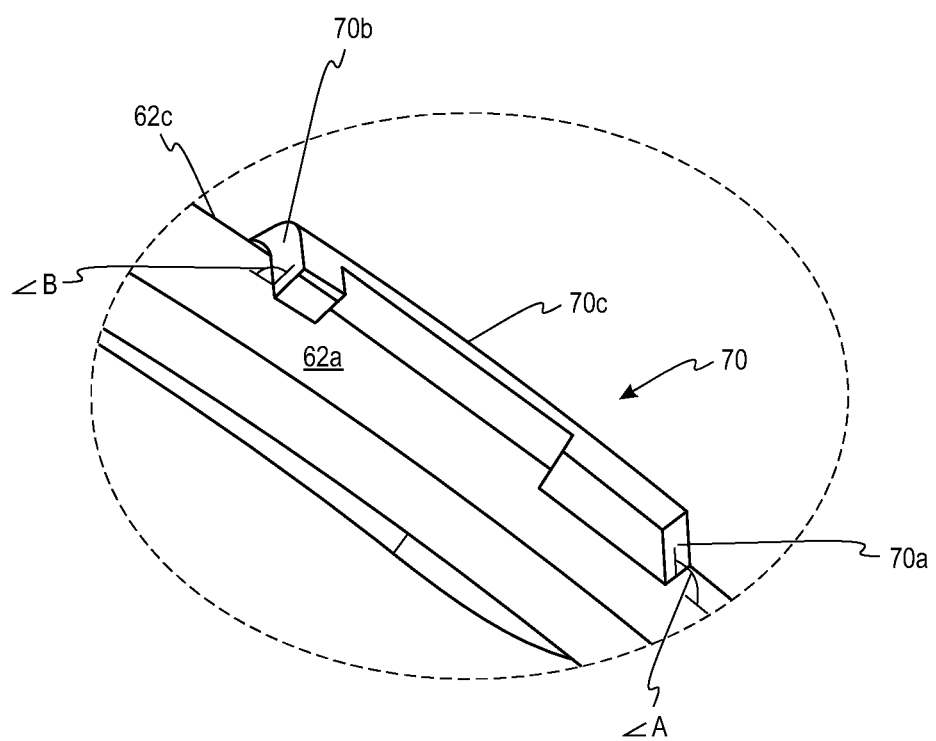
FIG. 2D is an enlarged view of FIG. 2D in FIG. 2C.

Referring to FIGS. 2A, 2C, 2D, each of the torque-transfer extending projections 70 has a ramped side 70a and a generally straight side 70b. Referring specifically to FIG. 2D, the generally straight side 70b is perpendicular or generally perpendicular to the exterior surface 62a of the polymeric top wall portion 62. The ramped side 70a and the generally straight side 70b are located on opposing sides of the torque-transfer extending projection 70. Each of the torque-transfer extending projections 70 has a top surface 70c that bridges the ramped side 70a and the generally straight side 70b. The ramped side 70a is angled and generally has an angle A of from about 110 to about 160 degrees, and typically has an angle A from about 120 to about 150 degrees. The generally straight side generally 70b has an angle B of from about 75 to about 105 degrees, and typically has an angle B from about 80 to about 100 degrees.

The plurality of torque-transfer extending projections 70 of the polymeric inner shell 60 works in conjunction with the plurality of torque-transfer ribs 32 of the polymeric outer shell 20 to provide child resistance. It is noted that in the initial position of a polymeric closure assembly, the plurality of torque-transfer extending projections 70 of the polymeric inner shell 60 do not contact and are spaced from the plurality of torque-transfer ribs 32 of the polymeric outer shell 20.

If a user turns the polymeric closure assembly 10 in a counterclockwise direction (direction of arrow A in FIGS. 5A, 7A) in an attempt to open the container and access the contents, the plurality of torque-transfer ribs 32 will initially ride up the ramped side 70a of the torque-transfer extending projections 70 and along the top surface 70c and then downwardly at the generally straight side 70b. During this movement in the counterclockwise direction, the thread formation 80 of the polymeric inner shell 60 will not mate or engage with the thread formation of a container. Thus, the container 200 will not be opened and will remain in a closed position with the polymeric closure assembly 10 without sufficient top loaded force.

To open the container 200 such that the thread formation 80 of the polymeric inner shell 60 engages with a corresponding thread formation of the container, a user must press in an axial, downward direction (direction of arrow B in FIGS. 5A, 7A, 7B) on the exterior surface 22a of the polymeric top wall portion 22 of the polymeric outer shell 20 coupled with movement in a radially counterclockwise direction such that the thread formations of the polymeric inner shell and the container will engage with other, allowing the polymeric closure assembly 10 to unthread from the container 200. It is contemplated in another embodiment that the opening process may include rotating the polymeric closure assembly in the opposite direction—in a clockwise direction.

Each of the plurality of torque-transfer extending projections 70 shown in FIG. 2D is in the shape of the letter "C". This shape of the torque-transfer extending projections 70 is designed to reduce the material costs associated therewith, while still providing the functionality of the torque-transfer extending projections.

It is contemplated that the torque-transfer projections of the polymeric inner shell may be shaped or sized differently from that shown in FIGS. 2A, 2C, 2D. The torque-transfer projections, however, need to assist in preventing or inhibiting opening or closing of the container by rotational movement only in conjunction with the torque-transfer ribs of the polymeric outer shell.

The number of torque-transfer projections formed on the polymeric top wall portion of the polymeric inner shell may vary but is generally from about 4 to about 20. The number of torque-transfer projections formed on the polymeric top wall portion is typically from about 8 to about 16.

Referring to FIG. 2C, the exterior surface 64a of the polymeric annular skirt portion 64 of the polymeric inner shell 60 forms an outer retention ring 88. The outer retention ring 88 extends outwardly from a remainder of the polymeric annular skirt portion of the polymeric inner shell. The outer retention ring 88 in conjunction with the inwardly-extending annular retention ledge 42 assists in preventing or inhibiting the polymeric inner shell 60 from being separating from the polymeric outer shell 20. More specifically, the outer retention ring 88 assists in preventing or inhibiting a user from accessing and moving the polymeric outer shell 20 in a lateral direction (direction of arrow C in FIG. 5A) or moving the polymeric inner shell 60 in an opposing lateral direction (direction of arrow B in FIG. 5A) in an attempt to separate the polymeric inner shell 60 and the polymeric outer shell 20 from each other. The outer retention ring 88 and the inwardly-extending annular retention ledge 42 form an interference or a press fit in one embodiment.

The outer retention ring 88 is located at a general bottom of the polymeric annular skirt portion 64, which is located opposite from the polymeric top wall portion 62. The outer retention ring 88 extends or flares outwardly from a reminder of the polymeric annular skirt portion 64.

To reduce the weight of the polymeric closure assembly 10, the outer retention ring 88 is scalloped as shown best in FIGS. 2A, 2C, which does not alter the functionality of the outer retention ring 88. The outer retention ring includes extended portions 88a and scalloped portions 88b. The scalloping of the outer retention ring 88 occurs at regular intervals in which the scalloping extends to the outer diameter of the remainder of the polymeric annular skirt portion 64. The extended portions 88a and the scalloped portions 88b form a general sinusoidal wave around a periphery of the polymeric inner shell 60, which is best depicted in FIGS. 2A, 2B. The scalloped portions are designed to reduce the weight of the polymeric inner shell, while still providing desired rigidity and hoop strength.

It is contemplated that the shape of the outer retention ring may vary from a scalloped shape, while still reducing the weight of the polymeric inner shell and providing desired rigidity and hoop strength. Some non-limiting examples of shapes of outer retention rings may include, but are not limited to, half-moons, crescents, v-shaped, slots, thru holes and elliptical.

Referring specifically to FIGS. 5B, the polymeric annular skirt portion 64 of the polymeric inner shell 60 includes an internal thread formation 80 for mating engagement with an external thread formation of the container 200. The internal thread formation 80 is located on the interior surface 64b of the polymeric annular skirt portion 64. The internal thread formation 80 is one continuous helical thread in this embodiment. It is contemplated that the internal helical thread formation may be discontinuous.

In another embodiment, the internal thread formation of a polymeric annular skirt portion of a polymeric inner shell includes a first closure lead and a second closure lead, which are referred collectively as a double lead closure thread. Each of the first and second closure leads may be continuous. The first and second helical closure leads may be helical. The first positions of the first and second closure leads are often located roughly 180 degrees apart from each other and, thus, begin on generally opposing sides of the polymeric inner shell. It is contemplated that the first and second closure leads may be discontinuous.

It is also contemplated that the internal thread formation of the polymeric inner shell may differ from a helical thread formation. It is also contemplated that other internal thread formations may be used in the polymeric inner shell. For example, the internal thread formation may include a triple-threaded structure having first, second and third closure leads.

In addition to the polymeric outer and inner shells, the polymeric closure assembly includes a liner. The liner is configured to attach to both the polymeric inner shell and a finish of a container. The liner to be used is a two piece liner that is configured to separate into two separate pieces on opening as will be discussed below.

Figure 4A:
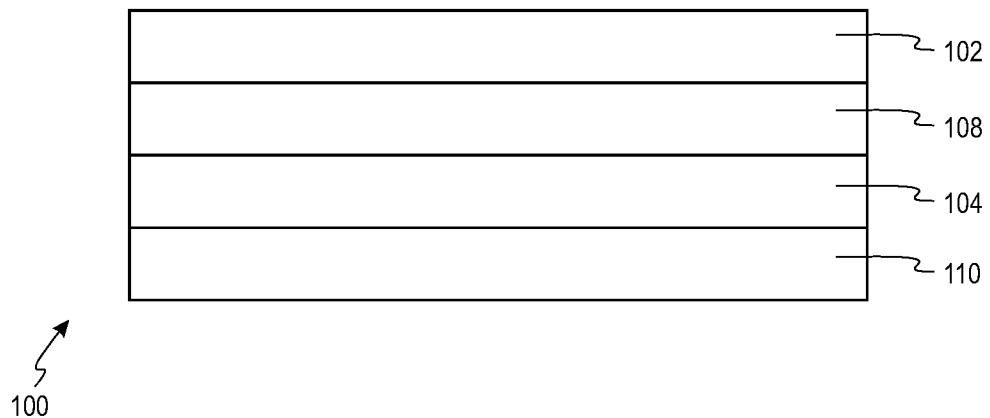
FIG. 4A is a side view of a liner according to one embodiment.

Referring to FIG. 4A, a liner 100 is shown that is to be used with the polymeric outer shell 20 and the polymeric inner shell 60 to form the polymeric closure assembly 10 of FIGS. 5A, 5B. The liner 100 assists in sealing the polymeric closure assembly 10 and the container 200 to form the package 300 (see FIGS. 7A, 7B). The liner 100 also forms the tamper-evident feature by sealing with a finish of a container as will be discussed below.

The liners of FIGS. 4A-4D are configured to cover the opening 66 formed in the polymeric inner shell 20. The liner prevents or inhibits any liquid that enters through the opening 26 of the polymeric outer shell 20 from entering into the interior surface 62a of the polymeric inner shell 60 after the liner is attached to the interior surface 62a of the polymeric inner shell 60.

FIG. 4A shows the liner 100 with four distinct layers in one embodiment. Specifically, the liner 100 includes a substrate layer 102, a foil layer 104, a separable layer 108, and an adhesive layer 110. The separable layer 108 of the liner 100 is located between the substrate layer 102 and the foil layer 104. The foil layer 104 of the liner 100 is located between the separable layer 108 and the adhesive layer 110. In this embodiment, the substrate layer 102 should have some adhesive qualities such that the substrate layer can be attached and remain attached to the interior surface 62a of the polymeric inner shell 60. The adhesive layer 110 assists in attaching to the finish of the container.

Figure 4B:
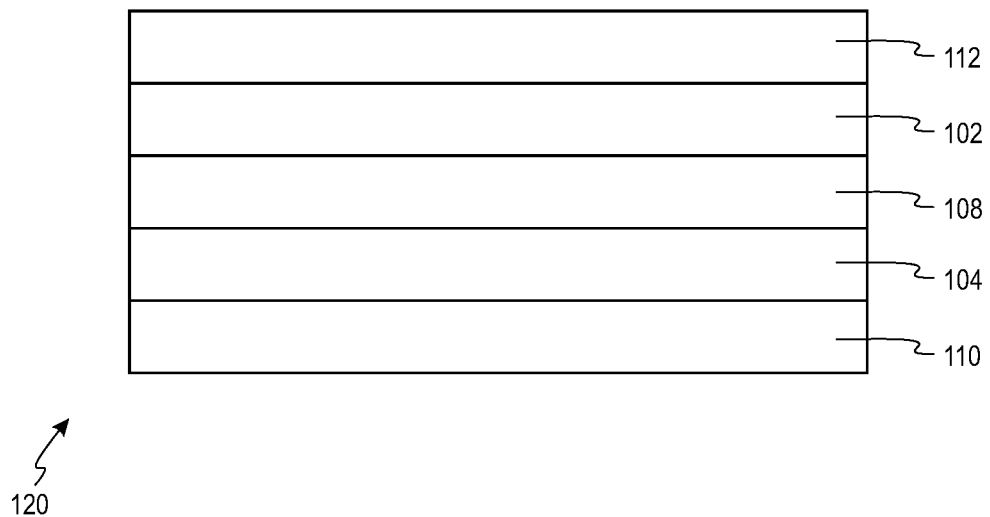
FIG. 4B is a side view of a liner according to another embodiment.

FIG. 4B shows a liner 120 with five distinct layers in another embodiment. The liner 120 is the same as the liner 100 except an adhesive layer 112 has been added. Specifically, the liner 120 includes the substrate layer 102, the foil layer 104, the separable layer 108, the adhesive layer 110, and the adhesive layer 112. The substrate layer 102 of the liner 120 is located between the adhesive layer 112 and the separable layer 108. The separable layer 108 of the liner 120 is located between the substrate layer 102 and the foil layer 104. The foil layer 104 of the liner 120 is located between the separable layer 108 and the adhesive layer 110. In this embodiment, the adhesive layer 112 assists in attaching to the interior surface of the polymeric inner shell. The adhesive layer 110 assists in attaching to the finish of the container.

Figure 4C:
FIG. 4C is a side view of a liner according to a further embodiment.

FIG. 4C shows a liner 140 with six distinct layers in a further embodiment. The liner 140 includes a second foil layer 106. Specifically, the liner 140 includes the substrate layer 102, the foil layer 104, the second foil layer 106, the separable layer 108, the adhesive layer 110 and an adhesive layer 114. The second foil layer 106 of the liner 140 is located between the adhesive layer 114 and the substrate layer 102. The substrate layer 102 of the liner 140 is located between the second foil layer 106 and the separable layer 108. The substrate layer 102 has adhesive qualities to adhere to the second foil layer 206. The separable layer 108 of the liner 140 is located between the substrate layer 102 and the foil layer 104. The foil layer 104 of the liner 140 is located between the separable layer 108 and the adhesive layer 110. In this embodiment, the adhesive layer 114 assists in attaching to the interior surface of the polymeric inner shell. The adhesive layer 110 assists in attaching to the finish of the container.

Figure 4D:
FIG. 4D is a side view of a liner according to yet another embodiment.

FIG. 4D shows a liner 160 with seven distinct layers in another embodiment. The liner 160 is the same as liner 140 except that the adhesive layer 112 has been added. The liner 160 also includes the second foil layer 106. Specifically, the liner 160 includes the substrate layer 102, the foil layer 104, the second foil layer 106, the separable layer 108, the adhesive layer 110, the adhesive layer 112, and the adhesive layer 114. The foil layer 106 of the liner 160 is located between the adhesive layer 114 and the adhesive layer 112. The substrate layer 102 of the liner 160 is located between the adhesive layer 112 and the separable layer 108. The separable layer 108 of the liner 160 is located between the substrate layer 102 and the foil layer 104. The foil layer 104 of the liner 160 is located between the separable layer 108 and the adhesive layer 110. In this embodiment, the adhesive layer 114 assists in attaching to the interior surface of the polymeric inner shell. The adhesive layer 110 assists in attaching to the finish of the container. The adhesive layer 112 assists in attaching the foil layer 106 and the substrate layer 102.

It is contemplated that other embodiments of the liner may be used in the polymeric closure assemblies.

The substrate layer 102 may be made of materials such as paperboard, pulp, backing board, fiberboard, cardboard, chipboard, or combinations thereof. The substrate layer 102 may comprise a polymeric material. Some non-limiting examples of polymeric materials include polyethylene terephthalate (PET), high density polyethylene (HDPE), polyethylene terephthalate (PET), polyhydroxyalkanoates (PHA) and poly(lactic acid) (PLA). The substrate layer 102 may include a foam layer in one embodiment. It is contemplated that other materials may be used to form the substrate layer in other embodiments.

The foil layers 104, 106 comprise foil such as aluminum foil. It is contemplated that other metallic materials or alloys such as those including aluminum may be used in forming the foil layers.

The separable layer 108 is a loosely bonded layer. The separable layer 108 may include a waxy adhesive layer (e.g., alpha olefin wax), patterned alpha olefin wax, pressure-sensitive adhesive, and an ultra-low density polyethylene (ULDPE). The separable layer may be melted during induction in one process. The separable layer 108 is configured such that when the polymeric closure assembly is opened as discussed below the foil layer 104 remains attached to the finish of the container. The separable layer 108 has a low holding strength such that upon opening the polymeric closure assembly the liner will be separated into two pieces. Specifically, the foil layer 104 remains attached to the finish of the container, while the remainder of the liner remains attached to the polymeric inner shell 60. The separable layer 108 may remain with the foil layer 104, the substrate layer 108, or a combination of both.

The adhesive layer 112 is a bonding layer that attaches the second foil layer 106 and the substrate layer 102. The bonding layer may be an adhesive layer such as polyurethane adhesive. The adhesive layer 112 desirably has a holding strength such that the foil layer 106 and the substrate layer 102 remain permanently attached to each other in one embodiment.

One of the liners is secured to an interior surface of the top polymeric wall portion of the polymeric inner shell. For example, the liner 100 is secured to an interior surface 62a of the top polymeric wall portion 62 of the polymeric inner shell 60 in FIGS. 5A, 5B. In one process, the liner 100 is secured to the interior surface 62a of the polymeric inner shell 60 by induction. The liner 100 is also secured to a finish of a container. The liner 100 is sealed to the finish of the container 200 and forms tamper-evidence between the closure and the package. The other described liners may be used instead of the liner 100.

Each of the liners forms an interference or press fit with an interior surface of the polymeric inner shell in one embodiment.

The thickness of the substrate layer 102 is generally from about 1 to about 3.5 mils in one embodiment. In another embodiment, the thickness of the substrate layer is from about 1 to about 2 mils. In a further embodiment, the thickness of the substrate layer is from about 1.3 mil to about 1.7 mils.

The thickness of the foil layers 104, 106 is generally from about 0.3 to about 2 mils in one embodiment. In another embodiment, the thickness of the foil layers 104, 106 is from about 0.7 to about 1.7 mils. In a further embodiment, the thickness of the foil layers 104, 106 is from about 1 to about 1.5 mils.

The thickness of the separable layer 108 is generally from about 5 to about 25 g/m$^3$ in one embodiment. In another embodiment, the thickness of the separable layer 108 is from about 10 to about 20 g/m$^3$. In a further embodiment, the thickness of the separable layer 108 is from about 12 to about 18 g/m$^3$.

The thickness of the adhesive layers 110, 112, 114 is generally from about 0.05 to about 0.015 mm in one embodiment. In another embodiment, the thickness of the adhesive layers 110, 112, 114 is from about 0.007 to about 0.012 mm. In a further embodiment, the thickness of the adhesive layers 110, 112, 114 is from about 0.008 to about 0.010 mm.

The total thickness of the liner is generally from about 1.8 to about 7 mils in one embodiment. In another embodiment, the total thickness of the liner is from about 2 to about 5.5 mils. In a further embodiment, the total thickness of the liner is from about 3 to about 5 mils.

The weight of the polymeric closure assembly is reduced from the openings formed in both of the polymeric outer and inner shells, and the thickness and reduction of material in forming the annular skirt portions of the polymeric outer shells and inner shells.

The weight of the polymeric closure assembly of the present invention is less than 40 weight percent of a similar sized and shaped polymeric closure assembly using the same polymer for forming the same. The weight of the polymeric closure assembly of the present invention is less than 50 weight percent of a similar sized and shaped polymeric closure assembly using the same polymer for forming the same. The weight of the polymeric closure assembly of the present invention is less than 60 weight percent of a similar sized and shaped polymeric closure assembly using the same polymer for forming the same.

The polymeric closure assemblies may include an oxygen-scavenger material. This oxygen-scavenger material may be distributed within the polymeric closure assemblies may be a separate layer. The oxygen-scavenger material may be any material that assists in removing oxygen within the container, while having little or no effect on the contents within the container.

Alternatively, or in addition to, the polymeric closure assemblies may include an oxygen-barrier material. The oxygen-barrier material may be added as a separate layer or may be integrated within the closure itself. The oxygen-barrier materials assist in preventing or inhibiting oxygen from entering the container through the polymeric closure assemblies. These materials may include, but are not limited to, ethylene vinyl alcohol (EVOH). It is contemplated that other oxygen-barrier materials may be used in the polymeric closure assemblies.

As discussed above, the polymeric container assembly 10 is used with the container 200 to form the package 300. The container has a neck portion defining an opening. The neck portion has an exterior surface and an interior surface. The container has an external thread formation on the neck portion.

Referring to FIG. 6, the container 200 is shown that includes a neck portion 202 defining an opening 206. The opening 206 is located opposite of a bottom 204 of the container 200. The container 200 includes a continuous side wall 208 that extends from the bottom 204 to the neck portion 202. The neck portion 202 of the container 200 includes an external thread formation 210 and an A-collar 214 to assist in manufacturing and movement of the container.

In one embodiment, a package comprises a container and a polymeric closure assembly. The container has a neck portion defining an opening. The neck portion has an exterior surface and an interior surface. The container has an external thread formation on the neck portion. The polymeric closure assemblies are configured for fitment to the neck portion of the container for closing the opening. The polymeric closure assemblies are configured to be placed on containers or bottles that contain product. The product may be a liquid product, but also may be a solid product or a combination of a liquid and solid product.

One non-limiting example of a polymeric closure assembly and a container forming a package is shown in FIGS. 7A, 7B. FIG. 7A is a top perspective view of the package 300 including the polymeric closure assembly 10 of FIGS. 5A, 5B and the container 200 of FIG. 6. FIG. 7B is a side perspective view of the package 300 including the polymeric closure assembly 10 of FIGS. 5A, 5B and the container 200 of FIG. 6. FIGS. 7A, 7B show the package 300 in an unopened position or state.

The outer shell portion 20 and the inner shell portion 60 are made of polymeric material. The outer shell portion 20 and the inner shell portion 60 are typically made of an olefin (e.g., polyethylene (PE), polypropylene (PP)), polyethylene terephthalate (PET) or blends thereof. One example of a polyethylene that may be used is high density polyethylene (HDPE). It is contemplated that the outer shell portion and the inner shell portion may be made of other polymeric materials.

The polymeric closure assemblies are typically formed by molding processes such as injection molding. It is contemplated that other processes may be used in forming the polymeric closure assemblies of the present invention.

The container 100 is typically made of polymeric material. One non-limiting example of a material to be used in forming a polymeric container is polyethylene terephthalate (PET), polyethylene (PE), polypropylene (PP), polyvinyl chloride (PVC), or blends using the same. It is contemplated that the container may be formed of other polymeric or copolymer materials. The container 100 is typically have an encapsulated oxygen-barrier layer or oxygen barrier material incorporated therein.

In one method of manufacturing the package, a closure assembly and a container are initially provided. A non-limiting example of a polymeric closure assembly is the polymeric closure assembly 10 and the container 200 discussed above. The polymeric closure assembly 10 is threaded onto the container 200 during manufacturing.

To open the polymeric closure assembly 10, a user rotates the polymeric outer shell 20 in a counterclockwise direction, while simultaneously pushing down with axial force (in the direction of arrow B in FIGS. 7A, 7B). This removes the polymeric closure assembly 10 from the container 200. This is the child-resistant feature to prevent or inhibit individuals from obtaining the contents located within an interior of the container 200 without both pressing with sufficient axially pressure with a rotational turn. During the rotational removal of the polymeric closure assembly 10, as discussed above, the liners are configured to separate into two pieces, resulting in a portion of the liner remaining attached to an interior surface of the polymeric inner shell while another portion remains attached to the finish of the container. This liner portion attached to the finish of the container provides a tamper-evidence feature. To gain access to the contents of the container, the liner portion including the foil layer may be removed or punctured.

To close the polymeric closure assembly 10, a user rotates the polymeric outer shell 20 in a clockwise direction in this embodiment. It is contemplated that the polymeric closure assembly may be configured to be opened in a clockwise direction and closed in a counterclockwise direction.

The polymeric closure assemblies are desirable in both low-temperature and high-temperature applications. The polymeric closure assemblies may be used in low-temperature applications such as an ambient or a cold fill. These applications include water, sports drinks, aseptic applications such as dairy products, and pressurized products such as carbonated soft drinks. It is contemplated that other low-temperature applications may be used with the polymeric closures.

The polymeric closure assemblies may be exposed to high-temperature applications such as hot-fill, pasteurization, and retort applications. A hot fill application is generally performed at temperatures around 185° F., while a hot fill with pasteurization is generally performed at temperatures around 205° F. Retort applications are typically done at temperatures greater than 244° F. It is contemplated that the polymeric closure assemblies can be used in other high-temperature applications.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A polymeric closure assembly comprising:
a polymeric outer shell including a polymeric top wall portion and a polymeric annular skirt portion, the polymeric top wall portion of the polymeric outer shell forming an opening therein, the polymeric annular skirt portion of the polymeric outer shell depending from the polymeric top wall portion of the polymeric outer shell, the polymeric top wall portion of the outer shell including an exterior surface and an interior surface;
a polymeric inner shell including a polymeric top wall portion and a polymeric annular skirt portion, the polymeric top wall portion of the polymeric inner shell forming an opening therein, the polymeric annular skirt portion of the polymeric inner shell depending from the polymeric top wall portion of the polymeric inner shell, the polymeric top wall portion of the polymeric inner shell including an exterior surface and an interior surface, the polymeric annular skirt portion of the polymeric inner shell including an exterior surface and an interior surface, the interior surface of the polymeric annular skirt portion of the polymeric inner shell including a thread formation for mating engagement with a thread formation of a container, the polymeric inner shell residing within the polymeric outer shell; and
a liner being configured to be attached to the interior surface of the polymeric top wall portion of the polymeric inner shell and a finish of the container, the liner including a substrate layer, a separable layer, a foil layer, and an adhesive layer, the separable layer being located between the substrate layer and the foil layer, the foil layer being located between the separable layer and the adhesive layer, the separable layer configured to assist in separating the liner into two pieces.

2. The closure assembly of claim 1, wherein the thread formation of the polymeric inner shell is an internal thread formation for mating engagement with an external thread formation of a container.

3. The closure assembly of claim 1, wherein the interior surface of the polymeric top wall portion of the polymeric outer shell includes a plurality of torque-transfer ribs, the exterior surface of the polymeric top wall portion of the polymeric inner shell including a plurality of torque-transfer extending projections, the plurality of torque-transfer ribs and the plurality of torque-transfer extending projections cooperating to form a child-resistant feature by preventing or inhibiting opening of the container by only rotational movement.

4. The closure assembly of claim 3, wherein each of the plurality of torque-transfer extending projections has a generally straight side and an opposing ramped side.

5. The closure assembly of claim 1, wherein the liner further includes a second adhesive layer, the substrate layer being located between the second adhesive layer and the separable layer.

6. The closure assembly of claim 1, wherein the liner further includes a second adhesive layer and a second foil layer, the second foil layer being located between the second adhesive layer and the substrate layer.

7. The closure assembly of claim 1, wherein the liner further includes a second adhesive layer, a second foil layer and a third adhesive layer, the second foil layer being located between the second adhesive layer and the third adhesive layer, the third adhesive layer being located between the second foil layer and the substrate layer.

8. The closure assembly of claim 1, wherein the opening forming the polymeric top wall portion of the polymeric outer shell extends from about 60 to about 95 percent of the diameter of the polymeric top wall portion of the polymeric outer shell.

9. The closure assembly of claim 8, wherein the opening forming the polymeric top wall portion of the polymeric outer shell extends from about 70 to about 85 percent of the diameter of the polymeric top wall portion of the polymeric outer shell.

10. The closure assembly of claim 1, wherein the opening forming the polymeric top wall portion of the polymeric outer shell is substantially the same size as the opening forming the polymeric top wall portion of the polymeric inner shell.

11. The closure assembly of claim 1, wherein the exterior surface of the polymeric annular skirt portion of the polymeric inner shell forms an outer retention ring extending outwardly, the interior surface of the polymeric annular skirt portion of the polymeric outer shell forming an inwardly-extending annular retention ledge, the outer retention ring and the inwardly-extending annular retention ledge assisting in preventing or inhibiting the polymeric inner shell from being separating from the polymeric outer shell.

12. A package comprising:
a container having a neck portion defining an opening, the neck portion having an exterior surface and an interior surface, the container having a thread formation being located on the exterior surface of the neck portion; and
a polymeric closure assembly configured for fitment to the neck portion of the container, the polymeric closure assembly including a polymeric inner shell, a polymeric outer shell, and a liner,
the polymeric outer shell including a polymeric top wall portion, a polymeric annular skirt portion, the polymeric top wall portion of the polymeric outer shell forming an opening therein, the polymeric annular skirt portion of the polymeric outer shell depending from the polymeric top wall portion of the polymeric outer shell, the polymeric top wall portion of the outer shell including an exterior surface and an interior surface,
the polymeric inner shell including a polymeric top wall portion, a polymeric annular skirt portion, the polymeric top wall portion of the polymeric inner shell forming an opening therein, the polymeric annular skirt portion of the polymeric inner shell depending from the polymeric top wall portion of the polymeric inner shell, the polymeric top wall portion of the polymeric inner shell including an exterior surface and an interior surface, the polymeric annular skirt portion of the polymeric inner shell including an exterior surface and an interior surface, the interior surface of the polymeric annular skirt portion of the polymeric inner shell including a thread formation for mating engagement with the thread formation of the container, the polymeric inner shell residing within the polymeric outer shell,
the liner being configured to be attached to the interior surface of the polymeric top wall portion of the polymeric inner shell and a finish of the container, the liner including a substrate layer, a separable layer, a foil layer, and an adhesive layer, the separable layer being located between the substrate layer and the foil layer, the foil layer being located between the separable layer and the adhesive layer, the separable layer configured to assist in separating the liner into two pieces.

13. The package of claim 12, wherein the interior surface of the polymeric top wall portion of the polymeric outer shell includes a plurality of torque-transfer ribs, the exterior surface of the polymeric top wall portion of the polymeric inner shell including a plurality of torque-transfer extending projections, the plurality of torque-transfer ribs and the plurality of torque-transfer extending projections cooperating to form a child-resistant feature by preventing or inhibiting opening of the container by only rotational movement.

14. The package of claim 12, wherein the liner further includes a second adhesive layer, the substrate layer being located between the second adhesive layer and the separable layer.

15. The package of claim 12, wherein the liner further includes a second adhesive layer and a second foil layer, the second foil layer being located between the second adhesive layer and the substrate layer.

16. The package of claim 12, wherein the liner further includes a second adhesive layer, a second foil layer and a third adhesive layer, the second foil layer being located between the second adhesive layer and the third adhesive layer, the third adhesive layer being located between the second foil layer and the substrate layer.

17. The package of claim 12, wherein the opening forming the polymeric top wall portion of the polymeric outer shell extends from about 60 to about 95 percent of the diameter of the polymeric top wall portion of the polymeric outer shell.

18. The package of claim 12, wherein the exterior surface of the polymeric annular skirt portion of the polymeric inner shell forms an outer retention ring extending outwardly, the interior surface of the polymeric annular skirt portion of the polymeric outer shell forming an inwardly-extending annular retention ledge, the outer retention ring and the inwardly-extending annular retention ledge assisting in preventing or inhibiting the polymeric inner shell from being separating from the polymeric outer shell.

19. The package of claim 12, wherein the separable layer includes a waxy adhesive layer, a patterned alpha olefin wax, pressure-sensitive adhesive, or an ultra-low density polyethylene (ULDPE).

20. The package of claim 12, wherein a total thickness of the liner is from about 1.8 to about 7 mils.

* * * * *